3,313,853
2-(TERTIARYAMINOALKOXYPHENYL)-3,4-DIHYDRONAPHTHALENES AND 2-(TERTIARYAMINOALKOXYPHENYL)-3,4-DIHYDRO-1(2H)-NAPHTHALENONES

Daniel Lednicer, Portage Township, Kalamazoo County, Mich., assignor to The Upjohn Company, Kalamazoo, Mich., a corporation of Delaware
No Drawing. Filed Oct. 16, 1963, Ser. No. 316,549
11 Claims. (Cl. 260—570.7)

This invention relates to novel dihydronaphthalenes and to processes for their preparation, and is more particularly concerned with 2-(tertiaryaminoalkoxyphenyl)-3,4-dihydronaphthalenes and with intermediates therefor and derivatives thereof and with processes for their preparation.

The novel compounds of the invention can be represented, for the most part, by the following formula:

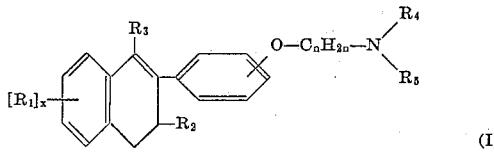

(I)

wherein $R_1$ is selected from the class consisting of lower-alkyl, halogen, trifluoromethyl, and lower-alkylenedioxy, $R_2$ is selected from the class consisting of hydrogen, lower-alkyl, phenyl, and phenyl substituted by at least one radical selected from the class consisting of lower-alkyl and halogen, $R_3$ is selected from the class consisting of hydrogen and lower-alkyl, $C_nH_{2n}$ is an alkylene radical containing from 2 to 6 carbon atoms, inclusive, $R_4$ and $R_5$ are selected from the class consisting of lower-alkyl and lower-alkyl linked together to form, with the attached nitrogen atom, a 5 to 7 ring atom saturated heterocyclic radical, and $x$ is an integer from zero to 4, inclusive.

The term "lower-alkyl" means an alkyl group containing from 1 to 8 carbon atoms, inclusive, such as methyl, ethyl, propyl, butyl, pentyl, hexyl, heptyl, octyl, and isomeric forms thereof. The term "halogen" means fluorine, chlorine, bromine, and iodine. The term "lower-alkylenedioxy" means an alkylenedioxy group containing from 1 to 8 carbon atoms, inclusive, such as methylenedioxy, ethylenedioxy, propylenedioxy, butylenedioxy, pentylenedioxy, hexylenedioxy, heptylenedioxy, octylenedioxy, and isomeric forms thereof. The term "alkylene radical containing from 2 to 6 carbon atoms, inclusive," means ethylene, propylene, butylene, pentylene, hexylene, and isomeric forms thereof. The term "lower-alkyl linked together to form, with the attached nitrogen atom, a 5 to 7 ring atom saturated heterocyclic radical" is inclusive of pyrrolidino, lower-alkylpyrrolidino such as 2-methylpyrrolidino, 2,2-dimethylpyrrolidino, 3-methylpyrrolidino, and the like, piperazino, lower-alkylpiperazino such as 2-methylpiperazino, 4-methylpiperazino, 2,4-dimethylpiperazino, and the like, piperidino, lower-alkylpiperidino such as 2-methylpiperidino, 3-methylpiperidino, 4,4-dimethylpiperidino, and the like, morpholino, hexamethylenimino, homopiperazino, homomorpholino, and the like.

The compounds of the invention having the Formula I can exist in the form of the free bases, the acid addition salts thereof, and the quaternary ammonium salts where in the anion is that of a pharmacologically acceptable acid.

The acid addition salts comprises the salts of the compounds having the Formula I with pharmacologically acceptable acids such as sulfuric, hydrochloric, nitric, phosphoric, lactic, benzoic, methanesulfonic, p-toluenesulfonic, salicylic, acetic, propionic, maleic, malic, tartaric, citric, cylohexylsulfamic, succinic, nicotinic, ascorbic acids, and the like.

The quaternary ammonium salts of the invention are the salts obtained by reacting the free bases having the Formula I with quaternating agents, for example, lower-alkyl halides, lower-alkenyl halides, di(lower-alkyl) sulfates, aralkyl halides, lower-alkyl arylsulfonates, and the like. The term "lower-alkyl" has the meaning above defined. The term "lower-alkenyl" means an alkenyl radical containing from 3 to 8 carbon atoms, inclusive, such as allyl, butenyl, pentenyl, hexenyl, heptenyl, octenyl, and isomeric forms thereof. The term "aralkyl" means an aralkyl group containing from 7 to 13 carbon atoms, inclusive, such as benzyl, phenethyl, phenylpropyl, benzhydryl, and the like. The term "lower-alkyl arylsulfonates" means the esters formed from lower-alkyl alcohols and arylsulfonic acids such as benzenesulfonic, toluenesulfonic, xylenesulfonic, and like acids. Examples of quaternary salts of the compounds of Formula I are the methobromide, methiodide, ethobromide, propyl chloride, butyl bromide, octyl bromide, methyl methosulfate, ethyl ethosulfate, allyl chloride, allyl bromide, benzyl bromide, benzhydryl chloride, methyl p-toluenesulfonate, ethyl p-toluenesulfonate, and the like.

The novel compounds having the Formula I including the free bases, the acid addition salts thereof, and the quaternary ammonium salts thereof, possess pharmacological activity. Illustratively, the compounds of the invention are useful as antifertility agents, anti-estrogenic agents, gonadotrophin-inhibiting agents, and as agents for the lowering of lipid and cholesterol blood levels in mammals including animals of economic value. In addition, the compounds of the invention possess activity as anti-inflammatory agents which makes them useful in mammals, including animals of economic value, when administered topically, for the alleviation of inflammation and burns, and also in the treatment of atopic dermatitis and contact dermatitis. Illustratively, the compound 1-methyl-2-[p-(2-diethylaminoethoxy)phenyl]-3-phenyl-3,4-dihydronaphthalene hydriodide exhibits anti-inflammatory activity of the order of that shown by hydrocortisone when tested in the granuloma pouch assay in rats using the procedure described by Robert et al., Acta Endocrinologica 25, 105, 1957.

In addition, the compounds of Formula I possess activity as central nervous system stimulants.

For purposes of administration to mammals, the novel compounds of the invention can be combined with solid or liquid pharmaceutical carriers and formulated in the form of tablets, powder packets, capsules, and like solid dosage forms, using starch and like excipients, or dissolved or suspended in suitable solvents or vehicles, for oral or parenteral administration.

In addition to their pharmacological activity, the compounds of the invention are also useful as intermediates. For example, the free base compounds of the Formula I can be reacted with fluosilicic acid to form the fluosilicate salts which in dilute aqueous solution are effective moth-proofing agents as more fully disclosed in U.S. Patents 2,075,359 and 1,915,334.

The novel compounds of the invention having the Formula I can be prepared according to the following reaction scheme:

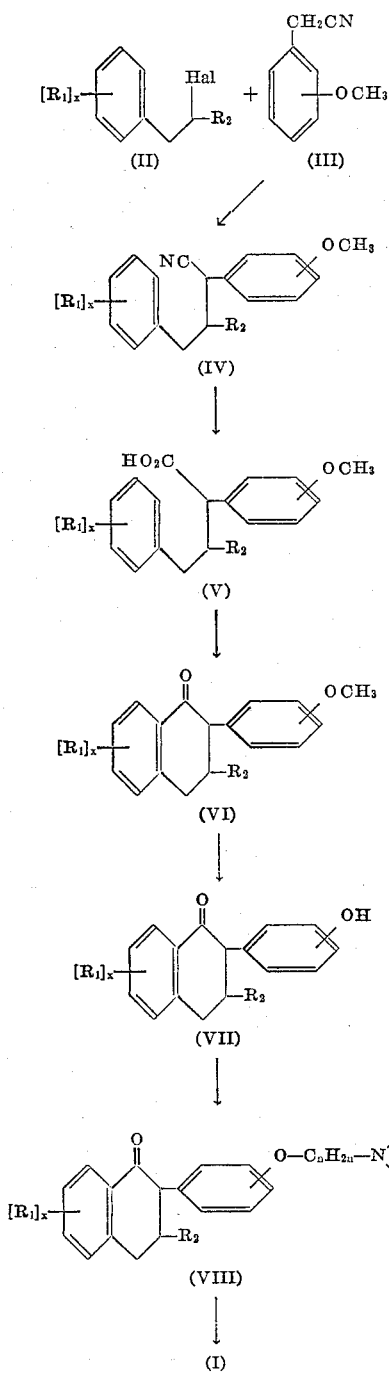

In the above formulae $R_1$, $R_2$, $R_4$, $R_5$, $C_nH_{2n}$, and $x$ have the significance hereinbefore defined, and Hal represents halogen, preferably chlorine or bromine.

In the above process the first stage comprises the reaction of the appropriately substituted phenethyl halide (II) and the appropriate methoxyphenylacetonitrile (III) to obtain the corresponding 2,4-diphenylbutyronitrile (IV). The reaction is conveniently carried out using the conditions described by Newman, J. Am. Chem. Soc., 62, 2295, 1940 for the condensation of o-tolylacetonitrile and 1-phenyl-2-bromopropane to obtain 2-(o-tolyl)-3-methyl-4-phenylbutyronitrile, namely, condensation of the reactants in the presence of sodamide and an inert organic solvent such as benzene, toluene, xylene, and the like.

The butyronitrile (IV) so obtained is then hydrolyzed to form the corresponding butyric acid (V) using procedures well known in the art for the hydrolysis of nitriles, for example, by heating with aqueous mineral acid such as sulphuric acid, hydrochloric acid, and the like. The desired acid (V) generally separates from the reaction mixture as a solid and is isolated by filtration and purified by recyrstallization or by other conventional procedures, for example, by conversion to an alkali metal salt followed by acidification of the latter to regenerate the free acid.

The acid (V) can also be prepared conveniently by an alternate synthesis illustrated schematically below:

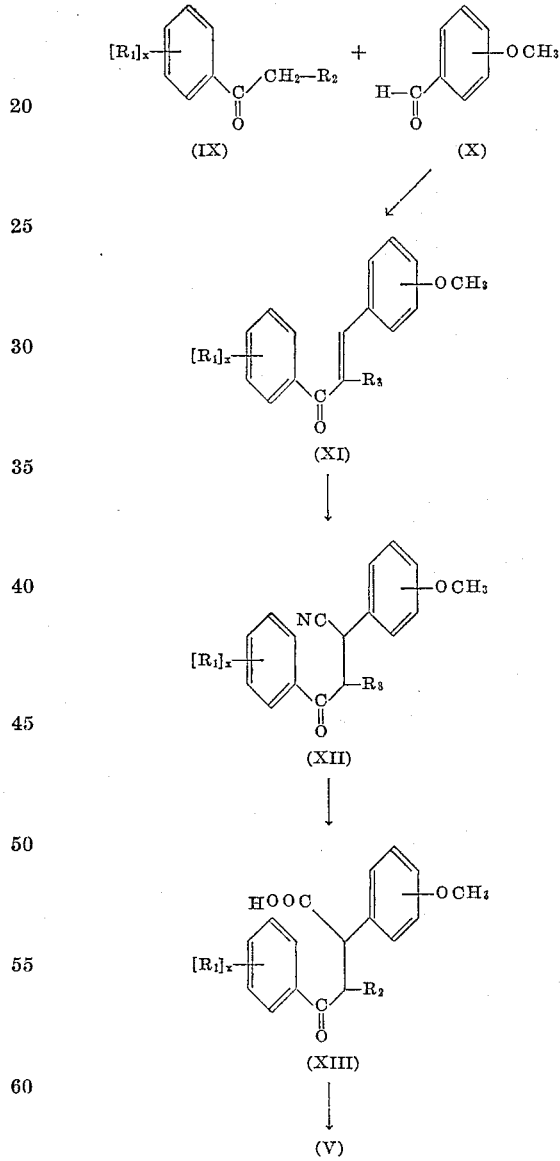

In the above formulae $F_1$, $R_2$ and $x$ have the significance hereinbefore defined.

In the above alternate synthesis of the acid (V), the appropriately substituted ketone (IX) is condensed with the appropriately substituted benzaldehyde (X) to produce the corresponding chalcone (XI) under conditions conventionally employed in the preparation of chalcones. For example, the reaction is carried out in the presence of a base such as sodium hydroxide, potassium hydroxide, and the like, in an inert solvent such as a mixture of water and lower-alkanol, for example, methanol, ethanol, and the like. The reaction is generally conducted at or below room temperature with external cooling as required. The chalcone (XI) is isolated from the reaction mixture and purified by conventional procedures, for example, by solvent extraction followed by distillation, in the case of a liquid product, or recrystallization in the case of a solid product.

The chalcone (XI) so obtained is then converted to the corresponding nitrile (XII) by reaction with hydrogen cyanide, for example, by treatment with an alkali metal cyanide such as potassium cyanide, sodium cyanide, and the like in the presence of acetic acid and an inert solvent such as aqueous methanol, aqueous ethanol, and the like, using the procedure described by Newman, J. Am. Chem. Soc., 60, 2947, 1938, for the conversion of benzalacetophenone (chalcone) to 2-phenyl-3-benzoylpropionitrile. The desired nitrile (XII) generally separates from the reaction mixture as a solid and can be isolated by filtration and purified by recrystallization.

The nitrile (XII) so obtained is hydrolyzed to the corresponding keto acid (XIII) by conventional procedures as described above for the hydrolysis of the nitrile (IV). The keto acid (XIII) so obtained is then subjected to reduction to obtain the desired acid (V). The reduction can be effected using any of the methods customarily employed for the conversion of a keto group to a methylene group. A particularly suitable reducing agent is amalgamated zinc and the treatment of the keto acid (XIII) with amalgamated zinc in the presence of a mineral acid affords the desired acid (V) in excellent yield. The acid (V) can be isolated from the reaction mixture by conventional procedures, for example, by decantation of the liquid reaction mixture, followed by solvent extraction of the decanted liquid and evaporation of the solvent. Generally speaking, the acid (V) so obtained is sufficiently pure to be used in the next step of the synthesis without further treatment. If desired, however, the acid (V) so obtained can be purified by conventional procedures, for example, by distillation in the case of a liquid or recrystallization in the case of a solid, or by conversion to an alkali metal salt followed by acidification of the latter to yield the free acid.

The acid (V), obtained by either of the above described methods, is then cyclized to the α-tetralone [i.e., the 3,4-dihydro-1(2H)-naphthalenone] (VI) in the presence of a Lewis acid, using the general procedure described by Fieser and Hershberg, J. Am. Chem. Soc., 61, 1272, 1939. The term "Lewis acid" is well known in the art and is defined succinctly by Fieser and Fieser, "Organic Chemistry," third edition, page 138 (Reinhold, 1956). Examples of such compounds are hydrogen fluoride, boron trifluoride, arsenic trifluoride, phosphorus pentafluoride, titanium tetrafluoride, concentrated sulfuric acid, polyphosphoric acid, and the like. The preferred Lewis acid for use in the above process is hydrogen fluoride.

A particularly convenient method of cyclizing the acid (V) according to the above procedure comprises adding the acid (V) to liquid hydrogen fluoride with stirring and then allowing the hydrogen fluoride to evaporate at about 20° to 30° C. The desired α-tetralone (VI) is then isolated from the residue by conventional methods, for example, by dissolving the residue in a suitable solvent such as ether, washing the solution so obtained with an aqueous solution of a base such as sodium carbonate, sodium hydroxide, and the like, and then evaporating the washed solution to dryness. The α-tetralone (VI) so obtained can be purified, if desired, by conventional procedures, for example, by recrystallization.

Alternatively, the acid (V) can be cyclized to the α-tetralone (VI) by conversion of the acid (V) to the corresponding acid chloride and treatment of the latter with aluminum chloride or stannic chloride according to the procedure described by Fieser et al., J. Am. Chem. Soc., 60, 170, 1938.

The α-tetralone (VI) is demethylated to the corresponding phenol (VII) using procedures well-known in the art for the demethylation of methyl phenyl ethers. For example, the α-tetralone (VI) is treated with concentrated aqueous hydrobromic acid, advantageously at elevated temperatures and preferably at the boiling point of the reaction mixture. The desired phenol (VII) can be isolated from the reaction mixture by conventional procedures, for example, by dilution with water followed by isolation of the precipitate. Purification is also effected by conventional procedures, for example, by recrystallization or conversion to an alkali metal salt followed by reliberation of the phenol.

Alternatively, the demethylation of the compound (VI) can be accomplished by other conventional procedures such as by heating with an aluminum halide, for example, aluminum chloride or aluminum bromide, in the presence of an inert solvent such as benzene, toluene, xylene, and the like.

The phenol (VII) so obtained is then alkylated by reaction with the appropriate tertiaryaminoalkyl halide

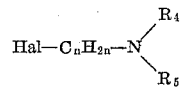

wherein $R_4$, $R_5$, and $C_nH_{2n}$ have the meaning hereinbefore defined and Hal is a halogen atom, to obtain the corresponding amino compound (VIII). The alkylation is conducted advantageously in an inert solvent such as a lower-alkanol, for example, methanol, ethanol, isopropyl alcohol, and the like, in the presence of a base such as sodium hydroxide, sodium methoxide, and the like. The desired amine (VIII) is isolated from the reaction mixture by conventional procedures such as by dilution with water followed by solvent extraction and evaporation of the solvent. The crude product so obtained can be purified by conventional procedures such as by recrystallization or by conversion to an acid addition salt.

The amine (VIII) is converted to the desired compound (I) in the following manner. Reduction of the keto group of the compound (VIII) to the corresponding carbinol followed by dehydration of the latter yields the corresponding compound of Formula I wherein $R_3$ is hydrogen. The reduction of the keto group is accomplished using reagents well known in the art for the reduction of keto to hydroxy groups, for example, lithium aluminum hydride or alkylaluminum hydrides such as diisobutylaluminum hydride, and the like. The reduction is advantageously carried out in the presence of an inert solvent such as ether, tetrahydrofuran, dioxane, benzene, toluene, xylene, and the like. The carbinol so produced is isolated from the reaction mixture using conventional procedures, for example, by decomposing the excess reducing agent using a carbonylic reagent such as ethyl acetate followed by water, and then evaporating the organic layer to dryness. Purification of the carbinol so obtained is carried out by well-known procedures such as recrystallization but, generally speaking, the product is employed in the subsequent step of dehydration without any purification.

The dehydration of the carbinol so obtained is accomplished by heating the carbinol in a solvent such as benzene, toluene, xylene, and the like, which forms an azeotrope with water, in the presence of a strong acid such as hydrochloric, sulfuric, p-toluenesulfonic acids, and the like. In certain cases, the dehydration requires more drastic conditions such as heating the compound at, or slightly above, its melting point, preferably in the presence of an inert gas, until evolution of water is complete.

The compound (I) wherein $R_3$ represents lower-alkyl is obtained by reacting the amine (VIII) with the appropriate alkylmagnesium halide $R_3MgHal$ wherein $R_3$ and Hal have the significance hereinbefore defined. The reaction is carried out advantageously in the presence of an inert solvent under anhydrous conditions in accordance with the established procedures for Grignard reactions. Suitable inert solvents include diisopropyl ether, diisobutyl ether, tetrahydrofuran, and the like. The reaction can be carried out at temperatures within the range of about 0° C. to about the boiling point of the solvent employed and is preferably carried out at elevated temperatures, for example, at or near the boiling point of the reaction mixture.

The desired compound (I; $R_3$=lower-alkyl) can be isolated from the reaction mixture by conventional procedures, for example, by decomposing the reaction mixture with water, ammonium chloride, and the like, followed by separation of the organic layer and removal of solvent therefrom. In many cases, the product so obtained is largely the desired compound (I) contaminated with minor impurities and unchanged starting material which can be removed by conventional procedures. However, in some cases, the desired 3,4-dihydronaphthalene (I) is contaminated with appreciable quantities of the corresponding 1-hydroxy-1,2,3,4-tetrahydronaphthalene having the following formula:

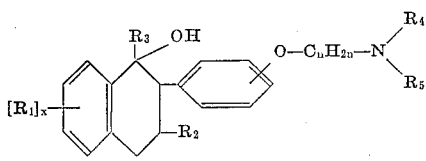

wherein $R_1$, $R_2$, $R_3$, $R_4$, $R_5$, $C_nH_{2n}$, and $x$ have the significance hereinbefore defined. In certain cases, the reaction product obtained is largely this compound containing only a small amount of the desired compound (I). The above 1-hydroxy-1,2,3,4-tetrahydronaphthalene, when obtained as the major reaction product or when present in significant quantities in the above-described reaction product, can be converted to the desired compound (I) by dehydration. The dehydration can be effected in most instances by heating in a solvent such as benzene, toluene, xylene, and the like, which forms an azeotrope with water, in the presence of a strong acid such as hydrochloric, sulfuric, p-toluenesulfonic acids, and the like. The water which is formed in the dehydration is removed from the reaction mixture azeotropically. There is thereby obtained a solution of the desired compound (I) from which the latter can be isolated by evaporation or other conventional procedures. In certain cases, the dehydration of the 1-hydroxy-1,2,3,4-tetrahydronaphthalene requires more drastic conditions such as heating the compound at, or slightly above, its melting point, preferably in the presence of an inert gas, until evolution of water is complete.

The amines having the Formula VIII above, in addition to their usefulness as intermediates in the preparation of the compounds (I), possess pharmacological activity. Illustratively, these compounds, in the form of their free bases or their acid addition salts or quaternary ammonium salts as hereinbefore defined, are active as antifertility agents, anti-estrogenic agents, gonadotrophin-inhibiting agents, and as agents for the lowering of lipid and cholesterol blood levels in mammals including animals of economic value. In addition, the compounds of Formula VIII possess activity as anti-inflammatory agents which makes them useful in mammals, including animals of economic value, when administered topically, for the alleviation of inflammation and burns, and also in the treatment of atopic dermatitis and contact dermatitis. Illustratively, the compound 2-[p-(2-diethylaminoethoxy)phenyl]-3-phenyl-3,4-dihydro-1(2H)-naphthalenone hydrochloride exhibits anti-inflammatory activity of the order of that shown by hydrocortisone when tested in the granuloma pouch assay in rats using the procedure described by Robert et al., supra. In addition, the compounds of Formula VIII possess activity as central nervous system stimulants.

The compounds of Formula VIII, including the free bases thereof, the acid addition salts thereof, and the quaternary ammonium salts thereof, can be formulated, using the procedures hereinbefore described for the compounds (I), for oral or parenteral administration to mammals including animals of economic value.

In addition to their pharmacological activity and their usefulness as intermediates for the preparation of the compounds (I), the compounds of Formula VIII are useful as intermediates in chemical synthesis. For example, the compounds of Formula VIII can be reacted with fluosilicic acid to form the fluosilicate salts which in dilute aqueous solution are effective mothproofing agents as more fully disclosed in U.S. Patents 2,075,359 and 1,915,334.

The compounds having the Formula III which are employed in the above-described synthesis of the compounds (I) are known compounds. The compounds having the Formula II also employed as starting materials are for the most part known or can be prepared by conventional procedures from known starting materials. Thus, the compounds of Formula II wherein $R_2$ is hydrogen can be obtained by reduction of the correspondingly substituted phenylacetic acids or esters thereof, for example, using lithium aluminum hydride according to the procedure described by Nystrom and Brown, J. Am. Chem. Soc., 69, 2548, 1947. The phenylacetic acids can themselves be prepared by reduction of the corresponding benzoic acids or esters thereof to the corresponding benzyl alcohols, for example using lithium aluminum hydride as described by Nystrom and Brown, supra; the benzyl alcohols so obtained are converted to the corresponding benzyl halides using procedures known in the art, for example, that described by Gilman and Kirby, J. Am. Chem. Soc., 51, 475, 1929; the benzyl halides so obtained are reacted with an alkali metal cyanide, such as sodium cyanide, to form the corresponding phenylacetonitriles and the latter are hydrolyzed, for example, using aqueous mineral acid or aqueous alkali to yield the desired phenylacetic acid.

The compounds (II) wherein $R_2$ is phenyl or substituted phenyl as hereinbefore defined can be prepared by condensing the appropriatley substituted phenylacetyl chloride:

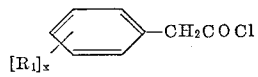

wherein $R_1$ and $x$ have the significance hereinbefore defined, with benzene or the appropriately substituted benzene under the conditions of the Friedel-Crafts condensation to obtain the corresponding ketone:

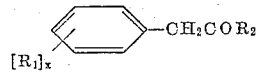

wherein $R_2$ is phenyl or substituted phenyl, and $R_1$ and $x$ have the significance hereinbefore defined. The ketone so obtained is then reduced to the corresponding carbinol using reducing agents well known in the art for the reduction of ketones to the corresponding alcohols, for example, using sodium in a lower-alkanol such as methanol, ethanol, and the like, or catalytically using hydrogen and Raney nickel, and the like. The carbinol so obtained is halogenated using, for example, hydrogen bromide as described by Kharasch and Kleiman, J. Am. Chem. Soc., 65, 11, 1943, or using, for example, phosphorus oxybromide as described by Gerrard, J. Chem. Soc., 1945, 106.

The compounds (II) wherein $R_2$ is lower-alkyl as hereinbefore defined can be prepared from the appropriately substituted ketone:

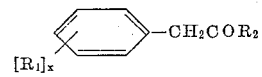

wherein $R_2$ is lower-alkyl, and $R_1$ and $x$ have the significance hereinbefore defined, by reducing the ketone to the corresponding carbinol using, for example, the methods obtained by further recrystallization from the same solvent.

Analysis.—Calcd. for $C_{17}H_{16}O_2$: C, 80.92; H, 6.39. Found: C, 80.56; H, 6.30.

(F) 2-(p-HYDROXYPHENYL)-3,4-DIHYDRO-1(2H)-NAPHTHALENONE

A mixture of 10.0 g. of 2-(p-methoxyphenyl)-3,4-dihydro-1(2H)-naphthalenone, 300 ml. of glacial acetic acid, and 300 ml. of 48% aqueous hydrobromic acid was heated under reflux for 24 hr. The resulting solution was diluted with 2 l. of water and the solid which separated was isolated by filtration, dissolved in a small quantity of methylene chloride, and chromatographed on a column of magnesium silicate (Florisil). The column was eluted with ligroin containing 10% by volume of acetone and those fractions which, on the basis of infrared and papergram analysis, were found to contain the desired material were combined an evaporated to dryness. The residue was recrystallized from aqueous methanol. There was thus obtained 3.89 g. of 2-(p-hydroxyphenyl)-3,4-dihydro-1(2H)-naphthalenone in the form of a crystalline solid having a melting point 97° to 104° C. An analytical sample having a melting point of 106° to 108° C. with decomposition (134° to 136° C. when placed in a melting point bath preheated to 95° C.) was obtained by recrystallization from aqueous methanol.

Analysis.—Calcd. for $C_{16}H_{14}O_2 \cdot \frac{1}{2}CH_3OH$: C, 77.93; H, 6.34. Found: C, 77.80; H, 6.04.

(G) 2-[p-(2-DIETHYLAMINOETHOXY)PHENYL]-3,4-DIHYDRO-1(2H-NAPHTHALENONE HYDROCHLORIDE

A solution of 3.91 g. of 2-(p-hydroxyphenyl)-3,4-dihydro-1(2H)-naphthalenone in 50 ml. of methanol was treated with 3.8 g. of 25% sodium methoxide in methanol solution. The resulting mxiture was stirred for 15 minutes before adding 4.45 g. of a 1:1 mixture of 2-diethylaminoethyl chloride and toluene. The mixture so obtained was heated overnight under reflux before being allowed to cool and evaporated to dryness under reduced pressure. The residue was treated with a mixture of water and ether and the organic layer was separated. The organic layer was extracted with 2.5 N. hydrochloric acid and the aqueous extract was itself extracted with several portions of methylene chloride. The methylene chloride extracts were combined and evaporated to dryness and the residue was recrystallized from a mixture of methylene chloride and ethyl acetate. There was thus obtained 2.20 g. of 2-[p-2-diethylaminoethoxy)phenyl]-3,4-dihydro-1(2H)-naphthalenone hydrochloride in the form of a crystalline solid having a melting point of 158° to 163° C. An analytical sample having a melting point of 160° to 163° C. was obtained by further recrystallization from the same solvent mixture.

Analysis.—Calcd. for $C_{22}H_{28}ClNO_2$: C, 70.67; H, 7.55; Cl, 9.48. Found: C, 70.35; H, 7.41; Cl, 9.44.

The free base was obtained from the above hydrochloride by dissolving the latter in methylene chloride, mixing the solution thoroughly with a slight excess of aqueous sodium hydroxide solution, and evaporating the methylene chloride layer to dryness.

EXAMPLE 2

2-[p-(2-diethylaminoethoxy)phenyl]-3-phenyl-3,4-dihydro-1(2H)-naphthalenone and the hydrochloride thereof (A) 2-(p-METHOXYPHENYL)-3,4-DIPHENYL-BUTYRONITRILE A solution of 30 g. of p-methoxyphenylacetonitrile in 100 ml. of ether was added to a solution of potassium amide prepared from 7.95 g. of potassium and 400 ml. of liquid ammonia. To the resulting mixture was added over a period 30 minutes a solution of 48.78 g. of α-chlorobibenzyl in 100 ml. of ether. The mixture so obtained was stirred for 1 hr. before being treated with 10 g. of ammonium chloride and evaporated to dryness under a stream of nitrogen. The residue was suspended in water and the insoluble material was isolated by filtration and recrystallized from aqueous methanol. There was thus obtained 58.4 g. of 2-(p-methoxyphenyl)-3,4-diphenylbutyronitrile in the form of a crystalline solid having a melting point of 86° to 93° C. An analytical sample having a melting point of 95° to 102° C. was obtained by further recrystallization from aqueous methanol of the product obtained from a similar run.

Analysis.—Calcd. for $C_{23}H_{21}NO$: C. 84.37; H, 6.47; N, 4.28. Found: C, 83.97; H, 6.72; N, 4.32.

(B) 2-(p-METHOXYPHENYL)-3,4-DIPHENYL-BUTYRIC ACID

A mixture of 58.4 g. of 2-(p-methoxyphenyl)-3,4-diphenylbutyronitrile, 58.0 g. of potassium hydroxide, and 500 ml. of ethylene glycol was heated under reflux for 18 hr. After cooling, the reaction mixture was diluted with water to approximately 2 l. and the mixture was filtered. The filtrate was acidified by the addition of hydrochloric acid and the solid which separated was isolated by filtration and recrystallized twice from aqueous methanol. There was thus obtained 44.05 g. of 2-(p-methoxyphenyl)-3,4-diphenylbutyric acid in the form of a crystalline solid having a melting point of 143° to 160° C. An analytical sample having a melting point of 147° to 153° C. was obtained by further recrystallization from the same solvent.

Analysis.—Calcd. for $C_{23}H_{22}O_3$: C, 79.74; H, 6.40. Found: C, 79.55; H, 6.17.

(C) 2-(p-METHOXYPHENYL)-3-PHENYL-3,4-DIHYDRO-1(2H)-NAPHTHALENONE

A mixture of 20.0 g. of 2-(p-methoxyphenyl)-3,4-diphenylbutyric acid and 11.6 g. of phosphorus pentachloride in 200 ml. of benzene was heated under reflux for 1 hr. The resulting solution was allowed to cool, 15.1 g. of stannic chloride was added, and the mixture was heated under reflux for a period of 18 hr. At the end of this time, the mixture was allowed to cool and was poured into 100 ml. of concentrated hydrochloric acid mixed with ice. The organic layer was separated and washed successively with water, aqueous sodium bicarbonate solution, and finally with aqueous saturated sodium chloride solution. The washed organic solution was evaporated to dryness and the residue was recrystallized twice from methanol and then from aqueous acetone. There was thus obtained 6.50 of 2-(p-methoxyphenyl)-3-phenyl-3,4-dihydro-1(2H)-napthalenone in the form of a crystalline solid having a melting point of 164° to 166° C.

Analysis.—Calcd. for $C_{23}H_{20}O_2$: C, 84.12; H, 6.14. Found: C, 83.77; H, 6.15.

(D) 2-(p-HYDROXYPHENYL)-3-PHENYL-3,4-DIHYDRO-1(2H)-NAPHTHALENONE

A solution of 16.84 g. of 2-(methoxyphenyl)-3-phenyl-3,4-dihydro-1(2H)-naphthalenone in 500 ml. of glacial acetic acid and 500 ml. of 48% aqueous hydrobromic acid was heated under reflux for 4.5 hr. The mixture so obtained was poured into ice-water and the solid which separated was isolated by filtration and was then recrystallized from aqueous ethanol. There was thus obtained 12.50 g. of 2-(p-hydroxyphenyl)-3-phenyl-3,4- dihydro-1(2H)-naphthalenone in the form of a crystalline solid having a melting point of 228° to 232° C.

Analysis.—Calcd. for $C_{22}H_{18}O_2$: C, 84.05; H. 5.77. Found: C, 83.68; H, 5.80.

(E) 2-[p-(2-DIETHYLAMINOETHOXY)PHENYL]-3-PHENYL-3,4-DIHYDRO-1(2H)-NAPHTHALENONE

A suspension of 12.5 g. of 2-(p-hydroxyphenyl)-3-phenyl-3,4-dihydro-1(2H)-naphthalenone in 125 ml. of methanol was treated with 9.20 g. of 25% by weight enumerated above and converting the carbinol so obtained to the corresponding halide using, for example, the methods enumerated above.

The phenones (IX), employed as starting materials in the alternate synthesis of the acids (V) as described above, are for the most part known. They can be prepared by conventional methods, for example, by reaction of the appropriate acyl halide with the appropriately substituted benzene under the standard conditions of the Friedel-Crafts reaction.

The acid addition salts of the compounds having the Formulae I and VIII can be prepared by methods well known in the art. For example, the acid addition salts of the invention can be prepared by reacting a free base of the Formula I or VIII with a pharmacologically acceptable acid, as hereinbefore exemplified, in the presence of an inert solvent such as methanol, ethanol, diethyl ether, ethyl acetate, and the like.

The quaternary ammonium salts of the invention can be prepared by reacting a free base of the Formula I or VIII with a quaternating agent, for example, an alkyl halide such as methyl iodide, ethyl chloride, isopropyl bromide, and the like, an alkenyl halide such as allyl chloride, allyl bromide, and the like, a dialkyl sulfate such as dimethyl sulfate, diethyl sulfate, and the like, an aralkyl halide such as benzyl bromide, benzhydryl chloride, phenethyl bromide, and the like, or an alkyl arylsulfonate such as methyl p-toluenesulfonate, and the like. Preferably, the reaction is effected by heating the reactants together in the presence of an inert solvent such as acetonitrile, acetone, methanol, ethanol, and the like. Generally speaking, the desired quaternary salt separates from solution upon cooling the reaction mixture and can be isolated by filtration. Purification of the quaternary salt can be effected by conventional methods, for example, by recrystallization.

The anion of the quaternary ammonium salt obtained as described above can be exchanged for any other desired anion, e.g., the anions of the various acids enumerated previously, by conventional procedures. For example, any of the quaternary ammonium salts of the invention can be converted to the corresponding quaternary ammonium hydroxide, illustratively, by treatment with silver oxide, and the hydroxide so obtained is reacted with the appropriate acid to obtain the desired quaternary ammonium salt.

The following examples illustrate the best method contemplated by the inventor for carrying out his invention, but are not to be construed as limiting the scope thereof.

EXAMPLE 1

2-[p-(2-diethylaminoethoxy)phenyl]-3,4 - dihydro-1(2H)-naphthalenone and the hydrochloride thereof (A) 4-METHOXYCHALCONE To a solution of 16.0 g. of sodium hydroxide in 140 ml. of water and 75 ml. of ethanol there was added 45.0 g. (46 ml.) of acetophenone. The temperature was adjusted to 15° C. and a total of 41.0 g. of anisaldehyde was added over 10 minutes. The resulting mixture was stirred at room temperature (approximately 25° C.) for a further 20 hr. The crystalline solid which had separated was isolated by filtration, washed with water, and recrystallized from methanol. There was thus obtained 78.02 g. of 4-methoxychalcone having a melting point of 70° to 73° C.

(B) 2-(p-METHOXYPHENYL)-4-PHENYL-4-KETOBUTYRONITRILE

A solution of 42.6 g. of potassium cyanide in 77 ml. of water was added with stirring to a suspension of 78.02 g. of 4-methoxychalcone in 150 ml. of ethanol and 20 g. of acetic acid. The resulting mixture was stirred vigorously and warmed to 45° C. before being cooled in an ice-bath for 1 hr. The solid which had separated was isolated by filtration, washed with ice-cold 50% aqueous ethanol and then with water. There was thus obtained 80.5 g. of 2-(p-methoxyphenyl)-4-phenyl-4-ketobutyronitrile having a melting point of 106° to 114° C. An analytical sample having a melting point of 114.5° to 116° C. was obtained by recrystallization from methanol.

*Analysis.*—Calcd. for $C_{17}H_{15}NO_2$: C, 76.96; H, 5.70; N, 5.28. Found: C, 77.16; H, 6.33; N, 5.40.

(C) 2-(p-METHOXYPHENYL)-4-PHENYL-4-KETOBUTYRIC ACID

A total of 80 g. of 2-(p-methoxyphenyl)-4-phenyl-4-ketobutyronitrile was added to a hot mixture of 225 ml. of concentrated sulfuric acid and 200 ml. of water. The mixture was heated on a steam bath with vigorous stirring for 3.5 hr. The resulting mixture was cooled and diluted with 3 liters of ice water. The black solid which separated was dissolved in methylene chloride and the methylene chloride extract was extracted with aqueous sodium bicarbonate solution. The latter extract was then acidified by the addition of hydrochloric acid and the solid which separated was isolated by filtration and recrystallized from aqueous methanol. There was thus obtained 55.46 g. of 2-(p-methoxyphenyl)-4-phenyl-4-ketobutyric acid in the form of a crystalline solid having a melting point of 153° to 155° C. An analytical sample having a melting point of 153.5° to 155.5° C. was obtained by further recrystallization from aqueous methanol.

*Analysis.*—Calcd. for $C_{17}H_{16}O_4$: C, 71.82; H, 5.67. Found: C, 71.50; H, 5.65.

(D) 2-(p-METHOXYPHENYL)-4-PHENYLBUTYRIC ACID

A total of 550 g. of zinc metal was amalgamated by treatment for 30 minutes with a solution of 12.6 g. of mercuric chloride in 1 liter of water. The aqueous layer was then decanted and the metal was washed well with water. To the washed metal was added 55.0 g. of 2-(p-methoxyphenyl)-4-phenyl-4-ketobutyric acid and 750 ml. of concentrated hydrochloric acid. The resulting mixture was heated under reflux and additional portions of 200 ml., 200 ml., and 100 ml. of concentrated hydrochloric acid was added at the end of 4, 8, and 24 hr. of heating, respectively. After a total of 28 hr. refluxing, the mixture was allowed to cool and was extracted with ether. The ether extract was evaporated to dryness and the residue was recrystallized from cyclohexane. There was thus obtained 46.32 g. of 2-(p-methoxyphenyl)-4-phenylbutyric acid having a melting point of 87° to 89° C. An analytical sample having a melting point of 88.5° to 90° C. was obtained by further recrystallization from cyclohexane.

*Analysis.*—Calcd. for $C_{17}H_{18}O_3$: C, 75.53; H, 6.71. Found: C, 75.93; H, 6.90.

(E) 2-(p-METHOXYPHENYL)-3,4-DIHYDRO-1(2H)-NAPHTHALENONE

To a solution of 45.72 g. of 2-(p-methoxyphenyl)-4-phenylbutyric acid in 500 ml. of anhydrous benzene was added 35.4 g. of phosphorus pentachloride. The resulting mixture was stirred for 2 hr. at approximately 25° C. and then for 2 hr. under reflux. The cooled solution was then treated with 44.1 g. of stannic chloride and the mixture so obtained was heated under reflux overnight before being cooled and stirred for 2 hr. with a mixture of ice and hydrochloric acid. At the end of this time, the organic layer was separated, washed with 2.5 N hydrochloric acid, followed by aqueous sodium bicarbonate solution and finally with saturated sodium chloride solution. The washed organic layer was evaporated to dryness under reduced pressure and the residue was washed with a small amount of methanol and then recrystallized twice from methanol. There was thus obtained 18.78 g. of 2-(p-methoxyphenyl)-3,4-dihydro-1(2H)-naphthalenone in the form of a crystalline solid having a melting point of 105° to 107.5° C. An analytical sample having a melting point of 105° to 107.5° C. was methanolic sodium methoxide in 20 ml. of methanol. To the resulting solution was added with stirring a solution of 10.8 g. of 50% by weight 2-diethylaminoethyl chloride in toluene. The mixture so obtained was heated under reflux for 18 hr. before allowing to cool and adding a mixture of water, ether, and methylene chloride. The organic layer was separated and washed several times with dilute aqueous sodium hydroxide solution and water before being evaporated to dryness. The gummy solid residue was dissolved in methylene chloride and the methylene chloride solution was saturated with gaseous hydrogen chloride before being evaporated to dryness. The residue was dissolved in water and the aqueous solution was extracted with several portions of ether before being made alkaline by the addition of aqueous sodium hydroxide solution. The solid which separated was isolated by filtration and recrystallized from aqueous methanol. There was thus obtained 7.50 g. of 2-[p-(2-diethylaminoethoxy)phenyl]-3-phenyl - 3,4 - dihydro - 1(2H)-naphthalenone in the form of a crystalline solid having a melting point of 97° to 103° C. An analytical sample having a melting point of 104° to 107° C. was obtained by further recrystallization from the same solvent.

Analysis.—Calcd. for $C_{26}H_{31}NO_2$: C, 81.32; H, 7.56; N, 3.39. Found: C, 80.95; H, 7.66; N, 3.42.

(F) 2 - [p - (2 - DIETHYLAMINOETHOXY)PHENYL] - 3-PHENYL-3,4-DIHYDRO - 1(2H)-NAPHTHALENONE HYDROCHLORIDE

A solution of 1 g. of 2-[p-(2-diethylaminoethoxy)phenyl]-3-phenyl - 3,4 - dihydro - 1(2H)-naphthalenone in 50 ml. of anhydrous ether was saturated with anhydrous hydrogen chloride. The solid which separated was isolated by filtration, washed with ether, and dried in vacuo. There was thus obtained 2-[p-(2-diethylaminoethoxy)phenyl]-3-phenyl-3,4-dihydro-1(2H)-naphthalenone hydrochloride.

EXAMPLE 3

2-[p-(2-diethylaminoethoxy)phenyl]-3-phenyl-3,4-dihydronaphthalene and the hydriodide thereof A solution of 1.50 g. of 2-[p-(2-diethylaminoethoxy)phenyl]-3-phenyl - 3,4 - dihydro - 1(2H)-naphthalenone in 50 ml. of ether was added to a well-stirred suspension of 1.50 g. of lithium aluminum hydride in 15 ml. of ether. The resulting mixture was heated under reflux for 1.5 hr. before cooling and decomposing the excess lithium aluminum hydride by the addition of ethyl acetate followed by water. The mixture so obtained was filtered and the filtrate was washed with water before being evaporated to dryness. The residual gum was heated under a Dean-Starke water trap with 250 ml. of benzene containing 1.30 g. of p-toluenesulfonic acid until no further water was eliminated and the residual solution was cooled and washed with aqueous sodium bicarbonate solution. The organic layer was evaporated to dryness and the residue was dissolved in ether. The ether solution was extracted with 10% aqueous hydriodic acid and the aqueous extract was itself extracted with methylene chloride. The methylene chloride extract was evaporated to dryness and the residue was recrystallized twice from a mixture of methylene chloride and ethyl acetate. There was thus obtained 2-[p-(2-diethylaminoethoxy)phenyl]-3-phenyl-3,4-dihydronaphthalene hydriodide in the form of a crystalline solid having a melting point of 168.5° to 170.5° C.

Analysis.—Calcd. for $C_{28}H_{32}INO$: C, 64.00; H, 6.14. Found: C, 63.97; H, 6.67.

A solution of 1 g. of the hydriodide so obtained was dissolved in 50 ml. of methylene chloride and the solution was mixed thoroughly with a slight excess of aqueous sodium hydroxide solution. The methylene chloride layer was evaporated to dryness. There was thus obtained 2-[p-(2-diethylaminoethoxy)phenyl]-3-phenyl-3,4-dihydronaphthalene.

EXAMPLE 4

1-methyl-2-[p-(2-diethylaminoethoxy)phenyl]-3-phenyl-3,4-dihydronaphthalene and the hydriodide thereof A solution of 1.50 g. of 2-[p-(2-diethylaminoethoxy)phenyl]-3-phenyl - 3,4 - dihydro - (2H) - naphthalenone in 50 ml. of tetrahydrofuran was added to 20 ml. of 2 M methylmagnesium bromide in a mixture of tetrahydrofuran and benzene. The mixture so obtained was heated under reflux for 18 hr. before being cooled and decomposed by the cautious addition of water. The resulting mixture was filtered and the filtrate was diluted with ether, washed with water, and evaporated to dryness. The residue was heated under a Dean-Starke water trap with 250 ml. of benzene containing 1.30 g. of p-toluenesulfonic acid until no further water was eliminated and the residual solution was cooled and washed with aqueous sodium bicarbonate solution. The organic layer was evaporated to dryness and the residue was dissolved in ether. The ether solution was extracted with 10% aqueous hydriodic acid and the aqueous extract was itself extracted with methylene chloride. The methylene chloride extract was evaporated to dryness and the residue was recrystallized from a mixture of methylene chloride and ethyl acetate. There was thus obtained 0.60 g. of 1-methyl-2-[p-(2-diethylaminoethoxy)phenyl] - 3 - phenyl-3,4-dihydronaphthalene hydriodide in the form of a crystalline solid having a melting point of 227° to 230° C. An analytical sample having a melting point of 228° to 230° C. was obtained by further recrystallization from the same solvent mixture.

Analysis.—Calcd. for $C_{29}H_{34}INO$: C, 64.65; H, 6.34; I, 23.52. Found: C, 66.33; H, 6.65; I, 23.00.

A solution of 1 g. of the hydriodide so obtained was dissolved in 50 ml. of methylene chloride and the solution was mixed thoroughly with a slight excess of aqueous sodium hydroxide solution. The methylene chloride layer was evaporated to dryness. There was thus obtained 1-methyl - 2 - [p-(2-diethylaminoethoxy)phenyl]-3-phenyl-3,4-dihydronaphthalene.

EXAMPLE 5

1-methyl-2[p-(2-diethylaminoethoxy)phenyl]-3,4-dihydronaphthalene and the hydrochloride thereof A suspension of 1.20 g. of 2-[p-(2-diethylaminoethoxy)phenyl]-3,4-dihydro-1(2H)-naphthalenone hydrochloride in 50 ml. of ether was washed several times with aqueous sodium bicarbonate solution and the resulting ethereal solution of the free base was evaporated to dryness under reduced pressure. The residual gum (0.82 g.) was dissolved in 20 ml. of tetrahydrofuran and the solution was treated with a tenfold excess of methylmagnesium iodide (from 0.61 g. of magnesium and 2.55 g. of methyl iodide) in 25 ml. of tetrahydrofuran. The resulting mixture was heated under reflux for 18 hr. before being cooled and decomposed by the cautious addition of water. The insoluble precipitate was removed by filtration and the filtrate was diluted with ether, washed well with water, and evaporated to dryness. The residue was treated with a mixture of water and ether and the ether layer was separated and extracted with hydrochloric acid. The hydrochloric acid extract was itself extracted with methylene chloride and the methylene chloride extract was evaporated to dryness. The residue was recrystallized from a mixture of methylene chloride and ethyl acetate to obtain 0.29 g. of 1-methyl-2-[p-(2-diethylaminoethoxy)phenyl]-3,4-dihydronaphthalene hydrochloride in the form of a crystalline solid having a melting point of 225° to 230° C.

A suspension of 1 g. of the above hydrochloride in 50 ml. of ether was mixed thoroughly with aqueous sodium bicarbonate solution and the resulting ether solution was evaporated to dryness. There was thus obtained 1-methyl-2-[p-(2-diethylaminoethoxy)phenyl] - 3,4 - dihydronaphthalene.

EXAMPLE 6

*2-[p-(3-diethylaminopropoxy)phenyl] - 3,4 - dihydro-1 (2H)-naphthalenone and the hydrochloride thereof*

Using the procedure described in Example 1, but replacing the 2-diethylaminoethyl chloride employed in Part G by 3-diethylaminopropyl chloride, there are obtained 2-[p-(3-diethylaminopropoxy)phenyl] - 3,4 - dihydro-1 (2H)-naphthalenone and the hydrochloride thereof.

Similarly, using the procedure described in Example 1, but replacing the 2-diethylaminoethyl chloride employed in Part G by 2-diethylaminopropyl chloride,
2-dibutylaminoethyl chloride,
2-N-methyl-N-ethylaminoethyl chloride,
3-diethylaminobutyl chloride,
5-dimethylaminopentyl chloride,
2-diethylaminopentyl chloride,
6-dimethylaminohexyl chloride,
2-pyrrolidinoethyl chloride,
3-(2,2-dimethylpyrrolidino)propyl chloride,
2-piperidinoethyl chloride,
2-morpholinoethyl chloride,
2-(4-methylpiperazino)ethyl chloride,
2-hexamethyleneiminoethyl chloride,
2-homopiperazinoethyl chloride, and
2-homomorpholinoethyl bromide, there are obtained 2-[p-(2-diethylaminopropoxy)phenyl]-,
2-[p-(2-dibutylaminoethoxy)phenyl]-,
2-[p-(2-N-methyl-N-ethylaminoethoxy)phenyl]-,
2-[p-(3-diethylaminobutoxy)phenyl]-,
2-[p-(5-dimethylaminopentyloxy)phenyl]-,
2-[p-(2-diethylaminopentyloxy)phenyl]-,
2-[p-(6-dimethylaminohexyloxy)phenyl]-,
2-[p-(2-pyrrolidinoethoxy)phenyl]-,
2-{p-[3-(2,2-dimethylpyrrolidino)propoxy]phenyl}-,
2-[p-(2-piperidinoethoxy)phenyl]-,
2-[p-(2-morpholinoethoxy)phenyl]-,
2-{p-[2-(4-methylpiperazino)ethoxy]phenyl}-,
2-[p-(2-hexamethyleneiminoethoxy)phenyl]-,
2-[p-(2-homopiperazinoethoxy)phenyl]-, and
2-[p-(2-homomorpholinoethoxy)phenyl] - 3,4 - dihydro-1(2H)-naphthalenones, respectively, and the hydrochlorides thereof.

EXAMPLE 7

*2-[p-(3-diethylaminopropoxy)phenyl] - 3,4 - dihydronaphthalene and the hydriodide thereof*

Using the procedure described in Example 3, but replacing 2-[p-(2-diethylaminoethoxy)phenyl]-3-phenyl-3,4-dihydro-1(2H)-naphthalenone by 2-[p-(3-diethylaminopropoxy)phenyl]-3,4-dihydro-1(2H-naphthalenone, there are obtained 2-[p-(3-diethylaminopropoxy)phenyl]-3,4-dihydronaphthalene and the hydriodide thereof.

Similarly, using the procedure of Example 3, other 2-(tertiaryaminoalkoxy)phenyl - 3,4 - dihydro-1(2H)-naphthalenones of the invention, for example, those given at the end of Example 6, are converted to the corresponding 2 - (tertiaryaminoalkoxy)phenyl-3,4-dihydronaphthalenes and acid addition salts thereof.

EXAMPLE 8

*1-methyl-2-[p-(3-diethylaminopropoxy)phenyl] - 3,4 - dihydronaphthalene and the hydriodide thereof*

Using the procedure described in Example 4, but replacing 2-[p-(2-diethylaminoethoxy)phenyl]-3-phenyl-3,4-dihydro-1(2H)-naphthalenone by 2-[p-(3-diethylaminopropoxy)phenyl] - 3,4 - dihydro-1(2H)-naphthalenone, there are obtained 1-methyl-2-[p-(3-diethylaminopropoxy)phenyl]-3,4-dihydronaphthalene and the hydriodide thereof.

Similarly, using the procedure of Example 4, other 2-(tertiaryaminoalkoxy)phenyl - 3,4 - dihydro-1(2H)-naphthalenones of the invention, for example, those given at the end of Example 6, are converted to the corresponding 1-methyl-2-(tertiaryaminoalkoxy)phenyl-3,4-dihydronaphthalenes and acid addition salts thereof.

EXAMPLE 9

*1-propyl-2-[p-(2-diethylaminoethoxy)phenyl]-3-phenyl-3,4-dihydronaphthalene and the hydriodide thereof*

Using the procedure described in Example 4, but replacing methylmagnesium bromide by propylmagnesium bromide, there are obtained 1-propyl-2-[p-(2-diethylaminoethoxy)phenyl]-3-phenyl - 3,4 - dihydronaphthalene and the hydriodide thereof.

EXAMPLE 10

*1-octyl-2-[p-(2-diethylaminoethoxy)phenyl]-3-phenyl-3,4-dihydronaphthalene and the hydriodide thereof*

Using the procedure described in Example 4, but replacing methylmagnesium bromide by octylmagnesium bromide, there are obtained 1-octyl-2-[p-(2-diethylaminoethoxy)phenyl]-3-phenyl-3,4-dihydronaphthalene and the hydriodide thereof.

EXAMPLE 11

*2-[m-(2-diethylaminoethoxy)phenyl]-3,4-dihydro-1(2H)-naphthalenone and the hydrochloride thereof*

(A) 3-METHOXYCHALCONE

Using the procedure described in Example 1, Part A, but replacing anisaldehyde by m-methoxybenzaldehyde, there is obtained 3-methoxychalcone.

(B) 2 - [m - (2 - DIETHYLAMINOETHOXY)PHENYL]-3,4-DIHYDRO - 1(2H) - NAPHTHALENONE AND THE HYDROCHLORIDE THEREOF

Using the procedure described in Example 1, Parts B, C, D, E, F, and G, but replacing 4-methoxychalcone employed in Part B by 3-methoxychalcone, there are obtained 2-[m-(2-diethylaminoethoxy)phenyl]-3,4-dihydro-1(2H)-naphthalenone and the hydrochloride thereof.

EXAMPLE 12

*2-[m-(2-diethylaminoethoxy)phenyl]-3,4-dihydronaphthalene and the hydriodide thereof*

Using the procedure described in Example 3, but replacing 2-[p-(2-diethylaminoethoxy)phenyl]-3-phenyl-3, 4-dihydro - 1(2H) - naphthalenone by 2-[m-(2-diethylaminoethoxy)phenyl] - 3,4 - dihydro - 1(2H) - naphthalenone, there are obtained 2-[m-(2-diethylaminoethoxy)phenyl]-3,4-dihydronaphthalene and the hydriodide thereof.

EXAMPLE 13

*1-methyl-2-[m-(2-diethylaminoethoxy)phenyl]-3,4-dihydronaphthalene and the hydriodide thereof*

Using the procedure described in Example 4, but replacing 2-[p-(2-diethylaminoethoxy)phenyl]-3-phenyl-3, 4-dihydro - 1(2H) - naphthalenone by 2-[m-(2-diethylaminoethoxy)phenyl] - 3,4 - dihydro - 1(2H) - naphthalenone, there are obtained 1-methyl-2-[m-(2-diethylaminoethoxy)phenyl]-3,4-dihydronaphthalene and the hydriodide thereof.

EXAMPLE 14

*2-[p-(2 - diethylaminoethoxy)phenyl]-6-bromo-7-methyl-3,4-dihydro-1(2H)-naphthalenone and the hydrochloride thereof*

(A) 3'-BROMO-4'-METHYL-4-METHOXYCHALCONE

Using the procedure described in Example 1, Part A, but replacing acetophenone by 3'-bromo-4'-methylacetophenone (Lutz et al., J. Org. Chem., 12, 617, 1947), there is obtained 3'-bromo-4'-methyl-4-methoxychalcone.

Similarly, using the procedure described in Example 1, Part A, but replacing acetophenone by 4'-butylacetophenone (Overberger et al., J. Am. Chem. Soc., 75, 3326, 1953), 3',4'-(sec-butylidenedioxy)acetophenone (Hoch et al., Comptes Rendus 234, 2610, 1952), 3'-trifluoromethylacetophenone (Corse et al., J. Am. Chem. Soc., 70, 2837, 1948), butyrophenone, propiophenone, 2-p-tolylacetophenone (Newman et al., J. Am. Chem. Soc., 72, 264, 1950), and 2-p-chlorophenylacetophenone (Teich et al., J. Am. Chem. Soc., 72, 2796, 1950) there are obtained 4'-butyl-4-methoxychalcone,3',4'-(sec - butylidenedioxy)-4-methoxychalcone, 3'-trifluoromethyl-4-methoxychalcone, α-ethyl-4-methoxychalcone, α-methyl-4-methoxychalcone, α-(p-tolyl)-4-methoxychalcone, and α-(p-chlorophenyl)-4-methoxychalcone, respectively.

(B) 2 - [p - (2 - DIETHYLAMINOETHOXY)PHENYL] - 6-BROMO - 7 - METHYL - 3,4 - DIHYDRO - 1(2H) - NAPHTHALENONE AND THE HYDROCHLORIDE THEREOF

Using the procedure described in Example 1, Parts B, C, D, E, F, and G, but replacing 4-methoxychalcone employed in Part B by 3'-bromo-4'-methyl-4-methoxychalcone, there are obtained 2-[p-(2-diethylaminoethoxy)phenyl]-6-bromo-7-methyl-3,4-dihydro - 1(2H) - naphthalenone and the hydrochloride thereof.

Similarly, using the procedure described in Example 1, Parts B, C, D, E, F, and G, but replacing 4-methoxychalcone employed in Part B by 4'-butyl-4-methoxychalcone, 3',4'-(sec-butylidenedioxy)-4-methoxychalcone, 3'-trifluoromethyl-4-methoxychalcone, α-ethyl-4-methoxychalcone, α-methyl-4-methoxychalcone, α-(p-tolyl)-4-methoxychalcone and α-(p-chlorophenyl)-4-methoxychalcone, there are obtained 2 - [p - (2 - diethylaminoethoxy)phenyl] - 7-butyl-, 2-[p-(2-diethylaminoethoxy)phenyl]6,7-(sec-butylidenedioxy)-, 2-[p-(2-diethylaminoethoxy)phenyl]-6-trifluoromethyl-, 2-[p-(2-diethylaminoethoxy)phenyl]-3-ethyl-, 2-[p-(2-diethylaminoethoxy)phenyl]-3-methyl-, 2-[p-(2-diethylaminoethoxy)phenyl]-3-(p-tolyl)-, and 2-[p-(2 - diethylaminoethoxy)phenyl] - 3 - (p - chlorophenyl)-3,4-dihydro-1(2H)-naphthalenone, respectively, and the hydrochlorides thereof.

EXAMPLE 15

2-[*p*-(*2-diethylaminoethoxy*)*phenyl*]-*6-bromo-7-methyl-3,4-dihydronaphthalene and the hydriodide thereof*

Using the procedure described in Example 3, but replacing 2 - [p - (2 - diethylaminoethoxy)phenyl] - 3 - phenyl-3,4-dihydro-1(2H)-naphthalenone by 2-[p-(2-diethylaminoethoxy)phenyl] - 6 - bromo - 7 - methyl - 3,4 - dihydro-1(2H)-naphthalenone, there are obtained 2-[p-(2-diethylaminoethoxy)phenyl] - 6 - bromo - 7 - methyl - 3,4-dihydronaphthalene and the hydriodide thereof.

Similarly, using the procedure described in Example 3, but replacing 2 - [p - (2 - diethylaminoethoxy)phenyl] - 3-phenyl-3,4-dihydro-1(2H)-naphthalenone by 2-[p-(2-diethylaminoethoxy)phenyl]-7-butyl-, 2-[p-(2-diethylaminoethoxy)phenyl]-6,7-(sec.butylidenedioxy)-, 2-[p-(2-diethylaminoethoxy)phenyl]-6-trifluoromethyl-, 2-[p-(2-diethylaminoethoxy)phenyl]-3-ethyl-, 2-[p-(2-diethylaminoethoxy)phenyl]-3-methyl-, 2-[p-(2-diethylaminoethoxy)phenyl]-3-(p-tolyl)-, and 2-[p-(2-diethylaminoethoxy)phenyl] - 3 - (p - chlorophenyl) - 3,4 - dihydro - 1(2H)-naphthalenone, there are obtained 2-[p-(2-diethylaminoethoxy)phenyl] - 7 - butyl-, 2 - [p - (2 - diethylaminoethoxy)phenyl]-6,7-(sec-butylidenedioxy)-, 2-[p-(2-diethylaminoethoxy)phenyl]-6-trifluoromethyl-, 2-[p-(2-diethylaminoethoxy)phenyl]-3-ethyl-, 2-[p-(2-diethylaminoethoxy)phenyl]-3-methyl-, 2-[p-(2-diethylaminoethoxy)phenyl]-3-(p-tolyl)-, and 2-[p-(2-diethylaminoethoxy)phenyl]-3-(p-chlorophenyl)-3,4-dihydronaphthalene, respectively, and the hydriodides thereof.

EXAMPE 16

2 - [*p* - (2 - *diethylaminoethoxy*)*phenyl*] - 6 - *bromo-1,7-dimethyl-3,4-dihydronaphthalene and the hydriodide thereof*

Using the procedure described in Example 4, but replacing 2-[p-(2-diethylaminoethoxy)phenyl]-3-phenyl-3,4-dihydro-1(2H)-naphthalenone by 2-[p-(2-diethylaminoethoxy)phenyl] - 6 - bromo - 7 - methyl - 3,4 - dihydro-1(2H)-naphthalenone, there are obtained 2-[p-(2-diethylaminoethoxy)phenyl] - 6 - bromo - 1,7 - dimethyl - 3,4-dihydronaphthalene and the hydriodide thereof.

Similarly, using the procedure described in Example 4, but replacing 2-[p - (2 - diethylaminoethoxy)phenyl] - 3-phenyl-3,4-dihydro-1(2H)-naphthalenone by 2-[p-(2-diethylaminoethoxy)phenyl]-7-butyl-, 2-[p-(2-diethylaminoethoxy)phenyl]-6,7-(sec-butylidenedioxy)-, 2-[p-(2-diethylaminoethoxy)phenyl]-6-trifluoromethyl-, 2-[p-(2-diethylaminoethoxy)phenyl]-3-ethyl-, 2-[p-(2-diethylaminoethoxy)phenyl]-3-methyl-, 2-[p-(2-diethylaminoethoxy)phenyl] - 3 - (p - tolyl)-, and 2 - [p - (2 - diethylaminoethoxy)phenyl] - 3 - (p - chlorophenyl) - 3,4 - dihydro-1(2H)-napthalenone, there are obtained 1-methyl-2-[p-(2-diethylaminoethoxy)phenyl]-7-butyl-, 1-methyl-2-[p-(2 - diethylaminoethoxy)phenyl] - 6,7 - (sec - butylidenedioxy)-, 1-methyl-2-[p-(2-diethylaminoethoxy)phenyl]-6-trifluoromethyl-, 1-methyl-2-[p-(2-diethylaminoethoxy)-phenyl] - 3 - ethyl-, 1,3 - dimethyl - 2 - [p - (2 - diethylaminoethoxy)phenyl]-, 1-methyl-2-[p-(2-diethylaminoethoxy)phenyl]-3-(p-tolyl)-, and 1-methyl-2-[p-(2-diethylaminoethoxy)phenyl] - 3 - (p - chlorophenyl) - 3,4-dihydronaphthalene, respectievly, and the hydriodides thereof.

EXAMPLE 17

2-[*p*-(*2-diethylaminoethoxy*)*phenyl*]-*3-phenyl-3,4-dihydronaphthalene methiodide*

A solution of 1 g. of 2-[p-(2-diethylaminoethoxy)phenyl]-3-phenyl-3,4-dihydronaphthalene (Example 3) in 12 ml. of acetonitrile is cooled in ice. To the cooled solution is added 1.5 ml. of methyl iodide and the mixture is allowed to stand overnight before being poured into 100 ml. of ether. The solid which separates is isolated by filtration and recrystallized from a mixture of ethyl acetate and ether. There is thus obtained 2-[p-(2-diethylaminoethoxy)phenyl] - 3 - phenyl - 3,4 - dihydronaphthalene methiodide in the form of a crystalline solid.

Similarly, using the above procedure, but replacing methyl iodide by ethyl bromide, propyl bromide, allyl bromide, and benzyl bromide, there are obtained the ethobromide, propyl bromide, allyl bromide, and benzyl bromide, respectively, of 2-[p-(2-diethylaminoethoxy)-phenyl]-3-phenyl-3,4-dihydronaphthalene.

Similarly, using the procedure described above, but replacing 2 - [p - (2 - diethylaminoethoxy(phenyl) - 3-phenyl]-3,4-dihydronaphthalene by any of the free bases prepared as described in Examples 1, 2, and 4 through 16, there are obtained the corresponding methiodides, and like quaternary ammonium salts.

EXAMPLE 18

2-[*p*-(*2-diethylaminoethoxy*)*phenyl*]-*3-phenyl-3,4-dihydronaphthalene methochloride*

A solution of 1 g. of 2-[p-(2-diethylaminoethoxy)-phenyl]-3-phenyl-3,4-dihydronaphthalene methiodide in dimethylformamide is shaken with a slgiht excess of silver oxide until the precipitation of silver iodide is complete. The resulting mixture is filtered and the filtrate containing the corresponding quaternary ammonium hydroxide is neutralized by the addition of aqueous hydrochloric acid. The resulting mixture is evaporated to dryness to obtain 2 - [p - (2 - diethylaminoethoxy)phenyl] - 3 - phenyl-3,4-dihydronaphthalene methochloride.

Similarly, using the above procedure, but replacing hydrochloric acid by other acids such as sulfuric acid, hydrobromic acid, phosphoric acid, acetic acid, methanesulfonic acid, and the like, there are obtained the corresponding quaternary ammonium salts.

In like manner, using the above procedure, the anion of any of the quaternary ammonium salts of the invention can be exchanged by any other desired anion by forming the corresponding quaternary ammonium hydroxide and reacting the latter with the appropriate acid.

EXAMPLE 19

*2-[p-(2-diethylaminoethoxy)phenyl]-3-phenyl-3,4-dihydronaphthalene hydrobromide*

To a solution of 1 g. of 2-[p-(2-diethylaminoethoxy)phenyl]-3-phenyl-3,4-dihydronaphthalene in 100 ml. of ether is added dropwise with stirring a slight excess of a 0.1 M ethereal solution of hydrogen bromide. The solid which separates is isolated by filtration, washed with ether, and dried. There is thus obtained 2-[p-(2-diethylaminoethoxy)phenyl] - 3 - phenyl - 3,4 - dihydronaphthalene hydrobromide.

In like manner, employing any of the free bases of Examples 1 through 16 and the appropriate acid, there are obtained the corresponding acid addition salts. Illustratively, using procedures analogous to those described above, the free bases of Examples 1 through 16 are converted to their acid addition salts with sulfuric, nitric, phosphoric, lactic, benzoic, methanesulfonic, p-toluenesulfonic, salicylic, acetic, propionic, malic, tartaric, citric, cyclohexylsulfamic, succinic, nicotinic, and ascorbic acids.

I claim:

1. A compound selected from the class consisting of
(a) compounds having the formula:

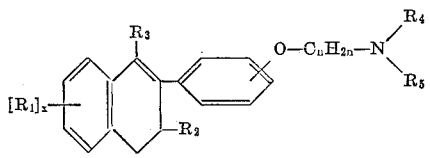

wherein $R_1$ is selected from the class consisting of lower-alkyl, halogen, trifluoromethyl, and lower-alkylenedioxy, $R_2$ is selected from the class consisting of phenyl and phenyl substituted by a radical selected from the class consisting of lower-alkyl and halogen, $R_3$ is selected from the class consisting of hydrogen and lower-alkyl, $C_nH_{2n}$ is an alkylene radical containing from 2 to 6 carbon atoms, inclusive, $R_4$ and $R_5$ are selected from the class consisting of lower-alkyl and lower-alkyl linked together to form, with the attached nitrogen atom, a heterocyclic radical selected from the class consisting of pyrrolidino, lower-alkylpyrrolidino, piperazino, lower-alkylpiperazino, piperidino, lower-alkylpiperidino, morpholino, hexamethylenimino, homopiperazino, and homomorpholino, and $x$ is an integer from zero to 2, inclusive;
(b) the pharmacologically acceptable acid addition salts thereof; and
(c) the quaternary ammonium salts of the compounds of the above formula wherein the anion of the quaternary salt is that of a pharmacologically acceptable acid.

2. A compound selected from the class consisting of 2-[p-(2-diethylaminoethoxy)phenyl] - 3 - phenyl- 3,4 - dihydronaphthalene and the pharmacologically acceptable acid addition salts thereof.

3. 2-[p-(2 - diethylaminoethoxy)phenyl]-3-phenyl-3,4-dihydronaphthalene.

4. A compound selected from the class consisting of 1-methyl-2-[p-(2 - diethylaminoethoxy)phenyl]-3-phenyl-3,4-dihydronaphthalene and the pharmacologically acceptable acid addition salts thereof.

5. 1-methyl - 2 - [p-(2-diethylaminoethoxy)phenyl]-3-phenyl-3,4-dihydronaphthalene.

6. A compound selected from the class consisting of
(a) compounds having the formula:

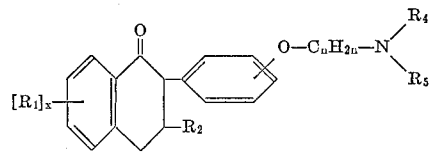

wherein $R_1$ is selected from the class consisting of lower-alkyl, halogen, trifluoromethyl, and lower-alkylenedioxy, $R_2$ is selected from the class consisting of hydrogen, lower-alkyl, phenyl, and phenyl substituted by a radical selected from the class consisting of lower-alkyl and halogen, $C_nH_{2n}$ is an alkylene radical containing from 2 to 6 carbon atoms, inclusive, $R_4$ and $R_5$ are selected from the class consisting of lower-alkyl and lower-alkyl linked together to form, with the attached nitrogen atom, a heterocyclic radical selected from the class consisting of pyrrolidino, lower-alkylpyrrolidino, piperazino, lower-alkylpiperazino, piperidino, lower-alkylpiperidino, morpholino, hexamethylenimino, homopiperazino, and homomorpholino, and $x$ is an integer from zero to 2, inclusive;
(b) the pharmacologically acceptable acid addition salts thereof; and
(c) the quaternary ammonium salts of the compounds of the above formula wherein the anion of the quaternary salt is that of a pharmacologically acceptable acid.

7. A compound selected from the class consisting of 2 - [p - (2 - diethylaminoethoxy)phenyl] - 3,4 - dihydro-1(2H)-naphthalenone and the pharmacologically acceptable acid addition salts thereof.

8. 2-[p-(2-diethylaminoethoxy)phenyl] - 3,4 - dihydro-1(2H)-naphthalenone hydrochloride.

9. 2-[p-(2-diethylaminoethoxy)phenyl] - 3,4 - dihydro-1(2H)-naphthalenone.

10. A compound selected from the class consisting of 2-[p-(2-diethylaminoethoxy)phenyl] - 3 - phenyl - 3,4 - dihydro-1(2H)-naphthalenone and the pharmacologically acceptable acid addition salts thereof.

11. 2-[p-(2 - diethylaminoethoxy)phenyl] - 3 - phenyl-3,4-dihydro-1(2H)-naphthalenone.

References Cited by the Examiner

UNITED STATES PATENTS 3,234,211    2/1966    Huebner et al. ___ 260—570.7 X

OTHER REFERENCES

Cope et al.: "Journal American Chemical Society," vol. 73, pages 1673–78 (1951).

Villani et al.: "Journal Med. Pharm. Chem.," vol. 5, No. 2, pages 373–83 (1962).

CHARLES B. PARKER, *Primary Examiner.*

ROBERT V. HINES, *Assistant Examiner.*